(12) United States Patent
Gombert

(10) Patent No.: US 7,296,463 B2
(45) Date of Patent: Nov. 20, 2007

(54) MEASURING DEVICE FOR MEASURING POSITIONS OR MOVEMENTS

(75) Inventor: Bernd Gombert, Grafrath (DE)

(73) Assignee: 3DConnexion GmbH, Seefeld (DE)

( * ) Notice: Subject to any disclaimer, the term of this patent is extended or adjusted under 35 U.S.C. 154(b) by 60 days.

(21) Appl. No.: 10/516,860

(22) PCT Filed: Jun. 10, 2003

(86) PCT No.: PCT/EP03/06058

§ 371 (c)(1),
(2), (4) Date: Dec. 3, 2004

(87) PCT Pub. No.: WO2004/072599

PCT Pub. Date: Aug. 26, 2004

(65) Prior Publication Data

US 2005/0172711 A1   Aug. 11, 2005

(30) Foreign Application Priority Data

Jun. 7, 2002   (DE) ................................ 102 25 418

(51) Int. Cl.
*G01L 1/04* (2006.01)
*G01N 3/26* (2006.01)
(52) U.S. Cl. .................................................. 73/161
(58) Field of Classification Search ............... 73/161, 73/862.041, 862.043
See application file for complete search history.

(56) References Cited

U.S. PATENT DOCUMENTS

| | | | |
|---|---|---|---|
| 3,628,394 A | 12/1971 | Keatinge et al. | |
| 3,921,445 A | 11/1975 | Hill et al. | |
| 5,181,079 A * | 1/1993 | Klinger | 356/614 |
| 5,798,748 A | 8/1998 | Hilton et al. | |
| 6,753,519 B2 * | 6/2004 | Gombert | 250/221 |
| 6,804,012 B2 * | 10/2004 | Gombert | 356/614 |
| 6,928,886 B2 * | 8/2005 | Meusel et al. | 73/862.324 |
| 7,026,599 B2 * | 4/2006 | Gombert | 250/221 |
| 2002/0056326 A1 | 5/2002 | Gombert et al. | |

FOREIGN PATENT DOCUMENTS

| | | |
|---|---|---|
| DE | 2727704 C3 | 1/1979 |
| DE | 3611336 C2 | 10/1987 |
| DE | 19758283 A1 | 7/1999 |
| DE | 19937307 A1 | 2/2000 |
| DE | 10034569 A1 | 1/2002 |
| GB | 1470352 | 4/1977 |

OTHER PUBLICATIONS

Forms PCT/ISA/210, 220 International Search Report for PCT/EP03/006058, Aug. 2003, (corresponds to AR, AC, and AL).

* cited by examiner

*Primary Examiner*—Michael Cygan
*Assistant Examiner*—O. Davis
(74) *Attorney, Agent, or Firm*—Wood, Herron & Evans, LLP

(57) ABSTRACT

A measuring apparatus for measuring of positions or movements of two objects relative to one another with a force and/or moment sensor and a conversion spring element, with the force and/or moment sensor being elastically connected with one of the objects at least via the conversion spring element. A force and/or moment sensor with the measuring apparatus. A joystick with the measuring apparatus or the force and/or moment sensor.

25 Claims, 3 Drawing Sheets

MEASURING DEVICE FOR MEASURING POSITIONS OR MOVEMENTS

CROSS REFERENCE TO RELATED APPLICATIONS

This application is a national stage entry of International Patent Application PCT/EP03/06058, filed Jun. 10, 2003, which claims priority to German Patent Application No. 102 25 418.4, filed Jun. 7, 2002, the disclosures of which are hereby incorporated by reference herein.

BACKGROUND OF THE INVENTION

The present invention relates to a measuring apparatus for measuring of positions or movements of two objects relative to one another. In addition, the invention relates to a force and/or moment sensor which utilises such a measuring apparatus. Finally, the invention relates to a joystick which comprises the measuring apparatus.

STATE OF THE ART

From DE 36 11 336 C2 a force and torque sensor is known which measures all the six possible force and torque components in the Cartesian coordinate system by means of strain gauges. The apparatus consists of two spoke wheels arranged one above the other and a total of 20 strain gauges which are wired to one another.

DE 36 11 337 A1 discloses an optoelectronic arrangement which can also detect six components. For this purpose, six light emitting means are arranged in a common plane at equal angular distances from one another in the interior of a plastic ball. Upstream of each light emitting means a stationary slit diaphragm is provided. The relative movements or relative positions are sensed by photosensitive detectors which are movably arranged relative to the arrangements of light emitting means and slit diaphragms. The detector axis of each detector extends orthogonally to the slit direction of the associated slit diaphragm.

Further documents which do not claim to be exhaustive and which show the technical background of the invention are:

DE 27 27 704 C3; DE 32 40 241 A1; U.S. Pat. No. 3,921,445; U.S. Pat. No. 3,628,394.

Problem on which the Invention is Based

The known measuring apparatuses have only a limited measuring range. This is essentially determined by type, length, and arrangement of the spokes and strain gauges or by type and relative arrangement of the light emitting means, slit diaphragms, and light sensitive detectors, respectively.

In different applications of the measuring apparatus measurements have to be made in different force or travel measuring ranges. Thus, a plurality of small batches with corresponding components and arrangements of the components has been manufactured for the plurality of potential applications.

On the basis of the state of the art, the present invention is based on the object to create a measuring apparatus for measuring positions or movements of two objects relative to one another, which can be easily adapted to different measuring ranges. The invention is further based on the object to create a force and/or moment sensor whose force/travel characteristic can be adapted to the requirements of different applications. The invention is finally based on the object to create a joystick for the input of up to six force or torque components, respectively.

Inventive Solution

For the solution of these objects, the invention teaches a measuring apparatus for measuring of positions or movements of two objects relative to one another, with is defined by the characteristics of claim 1. Furthermore, it teaches a force and/or moment sensor which is defined by the characteristics of claim 16. Finally, it teaches a joystick which is defined by the characteristics of claim 17.

The conversion spring means of the inventive measuring apparatus is capable of converting a spring travel or a spring rotation into a force or a moment, respectively. This force is measured by means of the force and/or moment sensor. The measuring range of the measuring apparatus may be adapted to the requirements of the application by the appropriate selection of the conversion spring means.

Construction and Development of the Inventive Solution

A preferred embodiment of the inventive measuring apparatus comprises a measuring spring means and a conversion spring means which are arranged in series. The spring means arranged in series connect a first assembly with a third assembly. The first assembly is connected with the one, the third assembly is connected with the other one of the two objects whose relative movements or relative positions are to be measured. In a particularly preferred embodiment of the invention, the first and/or the third assembly can also be the objects themselves. A second assembly is arranged between the two spring means connected in series. At least one optoelectronic measuring cell measures the travel length $s1$ of the relative movement of the second assembly relative to the first assembly, which results from the travel length of the relative movement $s2$ of the third assembly relative to the first assembly in an approximation as follows:

$$s1 = s2 \cdot K2/(K1+K2).$$

Here, $K1$ is the spring constant of the conversion spring means between the first and the second assembly, and $K2$ is the spring constant of the conversion spring means between the second and the third assembly.

Even if the measuring cell is capable of measuring relative movements with travel lengths $s1$ in only a limited range of values, the range within travel lengths $s2$ of the relative movements between the first assembly and the third assembly can be measured, may nevertheless be set almost arbitrarily large by the suitable selection of $K2$. If the measuring cell is capable, for example, of measuring relative movements along an axis in the range from minus 2 mm to plus 2 mm, the measuring apparatus, however, is to measure relative movements between the first and the third assembly with travel lengths in the range from minus 8 mm to plus 8 mm, this can be achieved by selecting a conversion spring means with a spring constant for which applies:

$$K2 = \frac{1}{3} \cdot K1.$$

In a preferred embodiment of the invention, the third assembly defines an inner space in which the first and the second assembly are arranged. The third assembly may, for example, form a part of the housing of the measuring apparatus. The inner space need not be enclosed. The third assembly is preferably securely connected with an object whose position relative to another object is to be determined. It is particularly preferred that the third assembly itself is said object, for example the housing of a joystick.

The conversion spring means which connects the third and the second assembly with each other preferably comprises one of the following components or combinations thereof: helical spring (assembly), moulded elastomer part, cast resin moulded part. In a preferred embodiment, the second assembly is suspended by the conversion spring means in the centre of the annulus of the third assembly. Preferably, the conversion spring means comprises three components for this purpose. The components are preferably arranged in a rotation symmetrical manner. In addition, they have preferably the same spring constant. It is particularly preferred that the components of the conversion spring means are helical springs. Moreover, the components of the conversion spring means are preferably biased.

The measuring spring means which connects the first with the second assembly preferably comprises one of the following components or combinations thereof: helical spring (assembly), moulded elastomer part, cast resin moulded part. The measuring spring, too, preferably comprises three components, and the components of the measuring spring are preferably arranged in a rotation symmetrical manner. In a preferred embodiment of the measuring apparatus the first assembly and the second assembly each comprise a printed circuit board. In this manner, the first and the second assembly can easily be provided with the elements of the measuring cells, i. e. position sensitive detectors, diaphragms, and light emitting means, as well as control electronics, if required, and other components.

In a preferred embodiment, at least one of the components of the first spring means comprises at least one helical spring whose ends are securely connected with the first or the second assembly, respectively, by soldering. In this manner, the helical springs can be loaded in all directions, i. e. thrust and compression forces as well as forces acting transversely to the helical spring can be applied without the springs moving in their seats or even coming out of them. In another preferred embodiment, a component of the first spring means comprises at least one elastomer cylinder whose ends are adhesively joined with the first or second assembly, respectively.

A system which comprises the first assembly, the second assembly, the measuring spring means, and the optoelectronic measuring cells lends itself readily to series production. By selecting a suitable conversion spring means, the measuring apparatus is then adapted to the desired measuring range.

In a preferred embodiment the measuring apparatus further comprises at least one stop means which limits the movement of the first assembly relative to the second assembly. This is preferably realised by stop bolts which are firmly connected with one board. In this manner, the measuring apparatus is protected against overload. The stop bolts protrude through holes in the second assembly.

In a preferred embodiment, the measuring apparatus comprises six optoelectronic measuring cells. In this manner, it is possible to measure relative movements and relative positions in six degrees of freedom. Three measuring cells preferably measure movements parallel to the plane of the first printed circuit board, and three measuring cells measure orthogonal movements. The optoelectronic measuring cells are preferably arranged on the circumference of a circle, particularly preferred in pairs, and preferably in a rotation symmetrical manner with respect to the centre of the circle. Measuring cells which measure the movements in the plane preferably alternate with those which measure orthogonal movements.

Each optoelectronic measuring cell comprises a position sensitive detector which is arranged in the beam path of a light emitting means as well as a slit diaphragm which is arranged in the beam path of the light emitting means between the light emitting means and the position sensitive detector. The detector axis is oriented vertically to the slit direction of the slit diaphragm. Thus, only a narrow light bar is incident on the position sensitive detector downstream of the diaphragm. The slit diaphragms of the measuring cells which measure the movements in the plane extend vertically to the plane, while the slit diaphragms of the measuring cells which measure the movements orthogonal to the plane extend parallel to the plane. It is particularly preferred that the light emitting means are infrared light emitting diodes and the position sensitive detectors are position sensitive infrared detectors.

One element of a system consisting of light emitting means, slit diaphragm, and detector and is movable relative to the two other elements. Consequently, the position of the narrow light bar on the position sensitive detector is dependent on the position of the movable element relative to the two other elements, and it is therefore possible to detect relative positions or relative movements.

Preferably, each measuring cell is assigned an own light emitting means which radiates radially towards a circular circumference. There, the position sensitive infrared detectors are arranged opposite the infrared light emitting diodes. The beam path therefore always extends in a direction originating from the centre. Due to the fact that each measuring cell is assigned an own light emitting means, the output signal of the position sensitive detectors can be utilised to control the currents of the correspondingly assigned light emitting means in such a manner that the same constant light quantity is incident on each position sensitive detector. This is advantageous in that all the six measuring systems are unaffected by temperature and aging influences as well as contamination and component tolerances over wide ranges.

In order to be able to measure relative movements one component each of the system light emitting means, slit diaphragm, detector must be movable relative to the other two elements. In the preferred embodiment, the slit diaphragm in each measuring cell is arranged either on the first or on the second assembly, and the position sensitive detectors and the light emitting means are arranged together on the respective other one of the two assemblies. This is advantageous in that all electronic components can be accommodated on a single printed board.

The inventive force and/or moment sensor employs the measuring apparatus according to the present invention. Hereby, the capability is utilised that the force/travel characteristic of the force and/or moment sensor can be adjusted in wide ranges by selecting the spring constant of the conversion spring means. The travel length of the relative movement s2 between the first and the third assembly is a function of the applied incremental force as follows:

$$s2 = F \cdot (1/K1 + 1/K2).$$

Here, s2 is the travel length of the relative movement between the first and the third assembly, F is to applied incremental force.

The inventive measuring apparatus or the inventive force and/or moment sensor, respectively, may particularly advantageously be employed in joysticks as are used for example for computer games in PCs or other playstations, but also e. g. for the control of machines and transport means. It is necessary to adapt the measuring range to the respective ambient conditions of the application. Accordingly, the present invention also comprises a joystick which utilises the measuring apparatus for measuring positions or movements of two objects relative to one another or a force and/or moment sensor according to one of the appended claims.

Further characteristics, properties, advantages, and possible modifications will become apparent for those with skill in the art from the following description of a preferred embodiment in which reference is made to the accompanying drawings.

DETAILED DESCRIPTION OF AN EMBODIMENT

Figure 1:
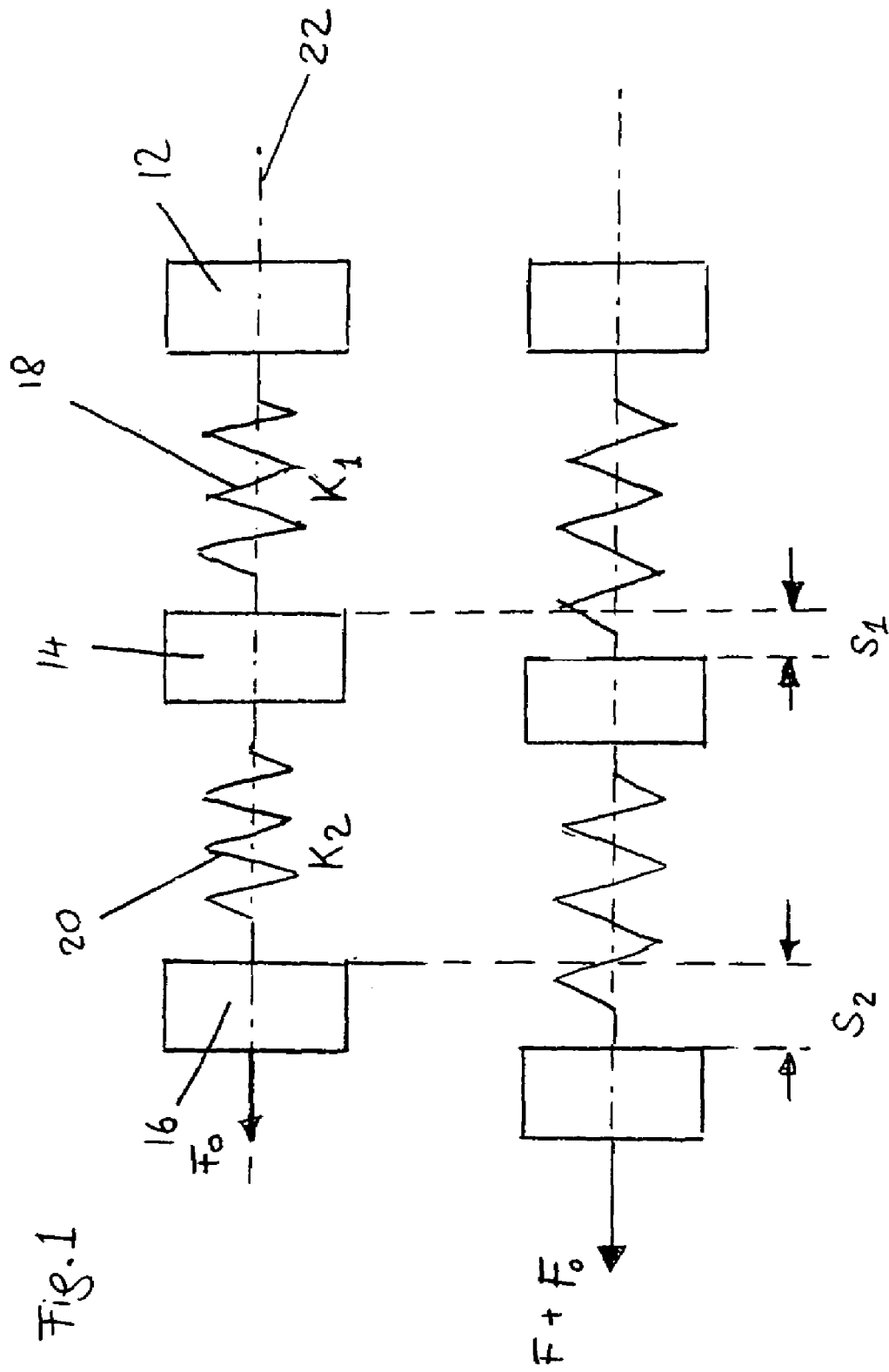
FIG. 1 schematically shows the operation of the measuring apparatus for measuring of positions or movements of two objects relative to one another and of the force and/or moment sensor.

In the following, the operation of the measuring apparatus for measuring of positions or movements of two objects relative to one another will be explained with reference to FIG. 1. The apparatus consists of a first 12, a second 14, and a third assembly 16 which are connected with each other via a measuring 18 and a conversion spring means 20. The measuring spring means 18 comprises spring properties with a spring constant K1 in the direction indicated by the straight line 22, the conversion spring means 20 comprises spring properties with a spring constant K2 in the same direction. If the measuring apparatus is also to be employed for the detection of travel lengths of relative movements or relative positions in other spatial directions and/or for the detection of rotary movements, then the spring means should analogously comprise spring properties in these spatial directions as well, namely essentially linear spring properties for the measurement of translations and torsion spring properties for the measurement of rotary movements. For the sake of simplicity, however, it is assumed in FIG. 1 that only translatory movements along the direction indicated by the straight line 22 are to be measured. It is also possible to take non-linear spring characteristics into consideration. This may, however, require an increased computation expenditure in the evaluation.

The second 14 and the third assembly 16 are freely movable relative to the first assembly 12. As can be seen in the lower part of FIG. 1, a displacement of the third assembly 16 relative to the first assembly 12 also results in a displacement of the second assembly 14 relative to the first assembly 12. As has been explained above, the extent of the displacement s1 is dependent on s2 and the spring constants K1 and K2. The displacement s1 is measured by an optoelectronic measuring apparatus. With K1 and K2 being known, s2 can be determined thereof.

In order to achieve the displacement, an incremental force F must be applied. In this manner, the inventive measuring apparatus 10 may also be employed as a force and/or moment sensor. The ratio between the incremental force F and the travel length of the relative movement s2 may be adjusted by the spring constants K2 and K2 as has been explained above.

Figure 2:
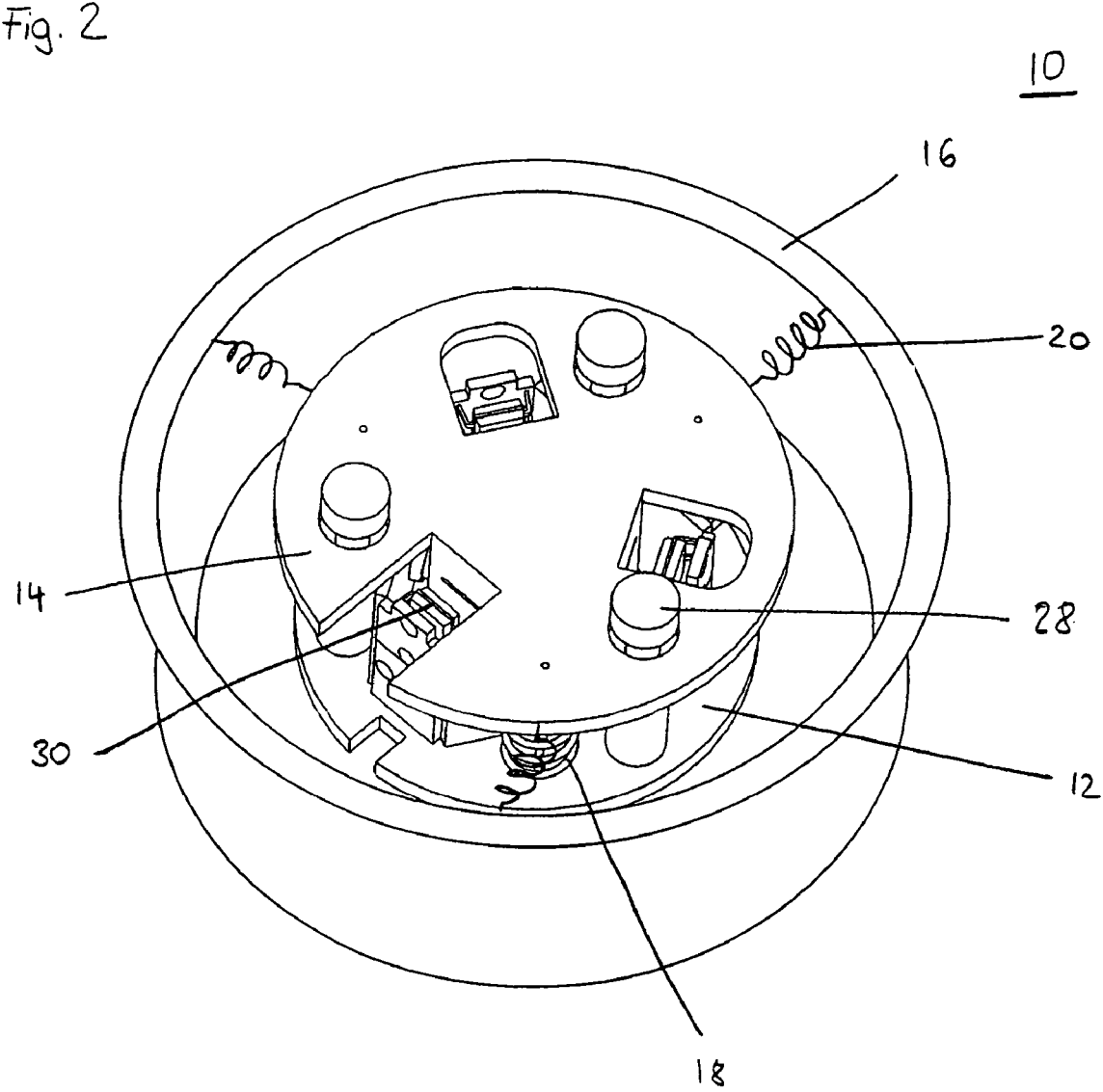
FIG. 2 shows a perspective plan view of an embodiment of the measuring apparatus and the force and/or moment sensor.

FIG. 2 illustrates a perspective view of the inventive measuring apparatus 10. By means of this apparatus 10 relative positions and relative movements may be measured in all six degrees of freedom, i. e. translations in three spatial directions and rotations about these spatial directions. For this purpose, the third assembly 16 forms an annulus in whose interior the first 12 and the second assembly 14 are arranged. The second assembly 14 is suspended by the spring means 20 in the centre of the annulus 16 and is freely movable. The conversion spring means 20 consist of three biased helical springs. The helical springs are arranged circularly about the centre of the annulus and comprise an angular distance of 120° each from one another.

The conversion spring means 20 has therefore spring properties in all three spatial directions and, moreover, acts as a torsion spring in the case of rotations about these spatial directions.

The third assembly 16 is part of the housing of a joystick for a personal computer or a playstation. The second 14 and the first assembly 12 are printed circuit boards. The first assembly 12 is connected with the second assembly 14 by a measuring spring means 18 which consists of three helical springs one end of which is firmly soldered to the second assembly 14 and whose other end is firmly soldered to the first assembly 12.

In this manner, the measuring spring means 18 functions both as a linear spring means in all three spatial directions and as a torsion spring in the case of rotations about these spatial directions. The measuring spring means 18 comprises three helical springs which are arranged in a rotation symmetrical fashion at an angle of 120° from one another.

In order to limit the relative movements or relative positions of the first 12 and the second assembly 14 so that any overload cannot result in damage occurring to the measuring apparatus 10 or the force and/or moment sensor, respectively, three stop means 24 in the form of stop bolts are provided. The stop bolts are securely connected with the first assembly 12 and project through holes in the second assembly 14. The horizontal movement of the second assembly 14 relative to first the assembly 12 is determined by the diameter of the stop means 24. The movement of the two assemblies 12 and 14 relative to one another is limited by enlargements 26 and 28 at the bolt-shaped stop means 24. The distances of the enlargements 26 and 28 from the second assembly 14 towards the axis of symmetry of the stop bolts determine the range within which the first assembly is movable relative to the second assembly 14 in this direction.

Figure 3:
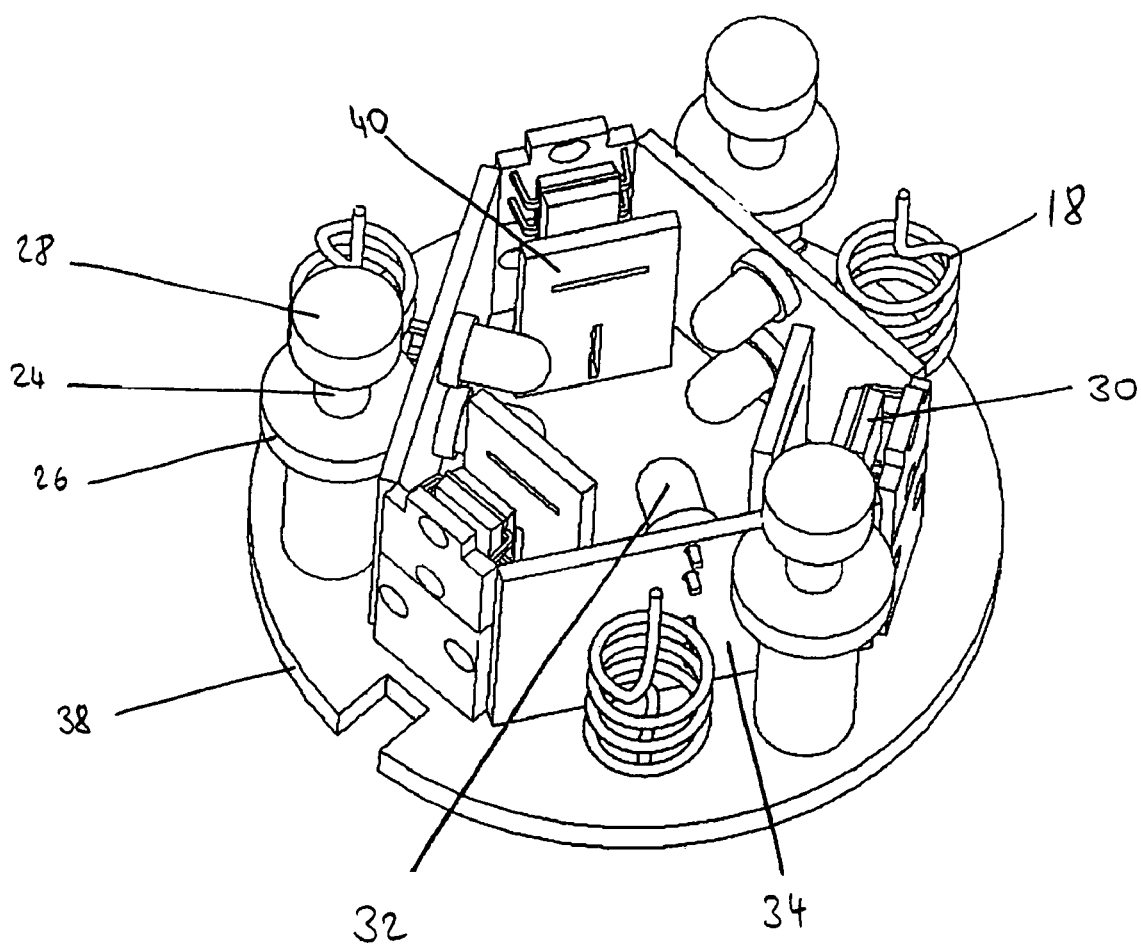
FIG. 3 shows a partial perspective plan view of the measuring apparatus and the force and/or moment sensor.

The measuring apparatus 10 is capable of measuring relative movements or relative positions of the first 12 and the second assembly 14 in six degrees of freedom, i. e. displacements in three linearly independent spatial directions and rotations also about three linearly independent spatial directions. For this purpose, three position sensitive infrared detectors 30 are provided which, together with six infrared light emitting diodes (ILEDs) 32 and six slit diaphragms form six measuring cells as shown in FIG. 3. The position sensitive infrared detectors 30 are rotated relative to one another by 120° each about the axis of symmetry of a cylinder surface which is defined by a printed circuit board 34. The ILEDs 32 are arranged in the same manner so as to be offset by 120° each about the same axis of symmetry. The axis of symmetry extends orthogonally from the printed circuit board 38 of the first assembly 12.

The position sensitive infrared detectors 30 are arranged in pairs of detectors 30 lying one above the other. The ILEDs 32 are arranged in the same manner as pairs if ILEDs 32 lying one above the other. Each ILED pair 32 is located between two pairs each of position sensitive infrared detectors 30. Each pair of position sensitive infrared detectors 30 consists of a position sensitive infrared detector 30 for detecting a movement perpendicular to the plane which is defined by the printed circuit board 38 of the first assembly, and a position sensitive infrared detector 30 for detecting a movement in this plane.

In each measuring cell a slit diaphragm 40 is arranged in the beam path of the ILED upstream of the position sensitive infrared detector. The slit diaphragm comprises a narrow slit, so that only a narrow light bar is incident on the position sensitive detector 30. The direction of the slit of the slit diaphragm 40 is oriented perpendicular to the detector axis, i. e. perpendicular to the measuring direction of the detector 30. Due to the fact that one element of the system ILED 32, slit diaphragm 40, and position sensitive infrared detector 30 is movable relative to the other two elements the measuring cell can detect relative movements and relative positions.

The ILEDs 32 and the position sensitive infrared detectors 30 are securely connected with the printed circuit board 38 of the first assembly via the vertical printed circuit board 34. The printed circuit board 38 additionally accommodates further electronic components for driving the ILED 32 and for evaluating the position information of the position sensitive detectors 30. The diaphragms 40 are firmly connected with the second assembly 14. The slit diaphragms 40 which are assigned a pair of detectors 30 arranged one above the other are combined to a single slit diaphragm with two slits extending perpendicular to one another.

In the inventive joystick, the upper enlargements 28 of the stop means 24 simultaneously serve for the attachment of the control handle of the joystick. In this manner, the joystick is connected with the first assembly 12 of the measuring apparatus 10 for measuring of positions or movement of two objects relative to one another. The annular third assembly 16 forms a part of the housing of the joystick. In this manner, movements of the handle relative to the housing can be converted into relative movements of the first assembly 12 with respect to the third assembly 16 and thus into relative movements of the first assembly 12 with respect to the second assembly 14 and measured in the manner as described above.

The invention claimed is:

1. A measuring apparatus (10) which consists of several assemblies, at least one of which comprises a force and/or moment sensor for measuring of positions or movements of two objects relative to one another, characterized in that it comprises:
 a conversion spring means (20) of biased springs which span an air gap which is defined by a certain distance of a first and a second assembly from a third assembly, with the first (12) and the second assembly (14) each comprising a printed circuit board and the force and/or moment sensor being elastically connected with one of the objects at least via the conversion spring means (20).

2. The measuring apparatus (10) according to claim 1, characterized in that it comprises:
 a force and/or moment sensor with at least
 a first assembly (12) which is connected with one of the two objects,
 a second assembly (14) which is elastically connected with the first assembly (12) by at least one measuring spring means (18), and
 at least one optoelectronic measuring cell for measuring the position or movement of the first (12) relative to the second assembly (14), and
 a third assembly (16) which is connected with the other one of the two objects and which is elastically connected with the second assembly (14) by the conversion spring means (20), with the position of the first assembly (12) relative to the third assembly (16) being changeable from outside, and the second assembly (14) assuming a position relative to the first assembly(12), which depends on the position of the third (16) relative to the first assembly (12).

3. The measuring apparatus (10) according to claim 1, characterized in that the third assembly (16) defines an interior space in which the first (12) and the second (14) assembly are arranged in such a manner that they are spaced from the third assembly (16) by the air gap.

4. The measuring apparatus (10) according to claim 3, characterized in that the conversion spring means (20) comprises a helical spring assembly which is preferably arranged in a rotation symmetrical fashion.

5. The measuring apparatus (10) according to claim 2, characterized in that the measuring spring means (18) comprises one of the following components or combinations thereof: helical spring (assembly), moulded elastomer part, moulded cast resin part.

6. The measuring apparatus (10) according to claim 5, characterized in that the measuring spring means (18) comprises three components arranged in a rotation symmetrical fashion.

7. The measuring apparatus (10) according to claim 6, characterized in that the first (12) and the second assembly (14) are essentially connected elastically with one another via the components of the measuring spring means (18).

8. The measuring apparatus (10) according to claim 7, characterized in that at least one component of the measuring spring means (18) comprises at least one helical spring which is firmly connected with the first (12) and second assembly (14) by soldering.

9. The measuring apparatus (10) according to claim 8, characterized by at least one stop means (24) which limits the movement of the first assembly (12) relative to the second assembly (14).

10. The measuring apparatus (10) according to claim 9, characterized in that it comprises at least six optoelectronic measuring cells in order to detect movements or positions in six degrees of freedom.

11. The measuring apparatus (10) according to claim 10, characterized in that the optoelectronic measuring cells are located on the circumference of a circle and are preferably arranged in pairs of measuring cells lying one above the other, and the pairs being preferably arranged in a rotation symmetrical fashion.

12. The measuring apparatus (10) according to claim 11, characterized in that each optoelectronic measuring cell comprises a position sensitive detector (30) arranged in the beam path of a light emitting means (32) as well as a slit diaphragm (40) arranged in the beam path of the light emitting means (32) between the light emitting means (32) and the position sensitive detector (30), with the detector axis of the position sensitive detector being oriented perpendicularly to the slit direction of the slit diaphragm (40), and one element of a system consisting of light emitting means (32), slit diaphragm (40), and detector (30) being movable relative to the other two elements.

13. The measuring apparatus (10) according to claim 12, characterized in that the slit diaphragm (40) in each measuring cell is arranged either on tile first (12) or on the second assembly (14), and the position sensitive detector (30) and the light emitting means (32) are arranged together on the respective other one of the two previously mentioned assemblies (12, 14).

14. A force and/or moment sensor, characterized by the measuring apparatus (10) according to claim 13.

15. A joystick characterized by
one of a force and/or moment sensor or a measuring apparatus (10) according to claim 14.

16. A means for measuring the relative positions or movements of two objects, comprising
a force and/or moment sensor with a first sensor subunit (12) which is connected with a first one of the objects, as well as a second sensor subunit (14) which is coupled to the first sensor subunit (12) relative to same in a springy fashion by means of a first spring arrangement (18), in the following referred to as measuring spring arrangement, with the two sensor subunits (12, 14) each carrying part of measuring components (30, 32, 40) for measuring of relative positions or movements of the two sensor subunits (12, 14) and
a second spring arrangement (20), in the following referred to as conversion spring arrangement, which is coupled to the second (16) of the objects relative to same in a springy fashion,
characterized in that the conversion spring arrangement (20) alone is coupled to the second sensor subunit (14) and the second object.

17. The means according to claim 16, characterized in that the second object (16) forms an annular body in whose annular interior the force and/or moment sensor is arranged at a distance from the annular body.

18. The means according to claim 17, characterized in that conversion spring arrangement (20) is formed by several conversion spring elements evenly distributed arranged in the direction of the annulus circumference, acting in parallel with each other.

19. The means according to claim 18, characterized in that the conversion spring elements are formed as helical springs.

20. The means according to claim 19, characterized in that the helical conversion springs are installed so as to be biased.

21. The means according to claim 20, characterized in that the helical conversion springs extend radially with respect to an annulus axis of the annular body (16).

22. The means according to claim 21, characterized in that the conversion spring arrangement (20) comprises a total of three conversion spring elements.

23. The means according to claim 22, characterized in that in that the two sensor subunits (12, 14) each comprise a carrier disk for mounting at least pans of the measuring components, and that the two carrier disks are arranged axially spaced one above the other with respect to the annulus axis of the annular body (16) and coupled to each other by the measuring spring arrangement (18).

24. The means according to claim 23, characterized in that the measuring components (30, 32, 40) of the force and/or moment sensor form six optoelectronic measuring cells for the detection of relative positions or movements of the two objects in six degrees of freedom, with each measuring cell being formed by an arrangement of a light emitting diode (32), a position sensitive detector (30), and a slit diaphragm (40) arranged in the beam path between the diode and the detector, with an axis of the detector being arranged perpendicularly to the slit direction of the slit diaphragm, and with one of the components: diode, detector, and slit diaphragm being arranged at one of the two sensor subunits (12, 14) while the two other ones of these components are arranged at the other sensor subunit.

25. A joystick with a measuring means according claim 24.

* * * * *